United States Patent [19]

Kimura et al.

[11] Patent Number: 5,804,621
[45] Date of Patent: Sep. 8, 1998

[54] POLYMERIC COMPOSITION

[75] Inventors: Kenji Kimura, Osaka; Motohiko Samizo, Kyoto, both of Japan

[73] Assignee: Sumitomo Chemical Company, Limited, Osaka, Japan

[21] Appl. No.: 755,047

[22] Filed: Nov. 22, 1996

[30] Foreign Application Priority Data

Nov. 27, 1995 [JP] Japan ................................. 7-307281

[51] Int. Cl.$^6$ ................................................ C08K 5/34
[52] U.S. Cl. ........................... 524/99; 524/100; 524/101; 524/102; 524/108; 524/117; 524/291
[58] Field of Search ............... 524/99, 100, 102, 524/101, 117, 108, 291

[56] References Cited

U.S. PATENT DOCUMENTS

| 3,702,878 | 11/1972 | Saito et al. | 524/117 |
| 5,356,967 | 10/1994 | Bohshar et al. | 524/117 |

FOREIGN PATENT DOCUMENTS

| 49-351 | 1/1974 | Japan | 524/117 |
| 49-17443 | 2/1974 | Japan | 524/117 |
| 60-123547 | 7/1985 | Japan | 524/117 |
| 64-85241 | 3/1989 | Japan | 524/117 |
| 1-141943 | 6/1989 | Japan | 524/117 |
| 4-1244 | 1/1992 | Japan | 524/117 |
| 4-351669 | 12/1992 | Japan . | |
| 4-370113 | 12/1992 | Japan | 524/117 |
| 5-17691 | 1/1993 | Japan | 524/117 |
| 5-86253 | 4/1993 | Japan | 524/117 |

*Primary Examiner*—Veronica P. Hoke
*Attorney, Agent, or Firm*—Pillsbury, Madison & Sutro LLP Cushman Darby & Cushman Intellectual Property Group

[57] ABSTRACT

A polymeric composition in which (D) a phenol antioxidant having a specific skeleton 5-t-butyl-3-methyl-4-hydroxyphenyl, (C) a hindered amine photostabilizer having a molecular weight of not less than 400, and (D) a specific phosphorus compound dihydrooxaphosphaphenanthrene are included in (A) a polymeric compound. This polymeric composition is excellent in thermal oxidation degradation resistance and discoloration of coloring resistance in contacting with a combustion gas or the like.

10 Claims, No Drawings

POLYMERIC COMPOSITION

BACKGROUND OF THE INVENTION

1. Field of the Invention

The present invention relates to a polymeric composition, more particularly a polymeric composition which comprises a specific phenol antioxidant, a specific light stabilizer and a specific phosphorus compound in a polymeric compound.

2. Description of the Prior Art

Polymeric compound such as polyethylene and polypropylene are known to contain a phenol antioxidant, phosphorus compound, light stabilizer and the like to improve thermal oxidation degradation and photodegradation.

For example, it is known that tetrakis[methylene-3-(3,5-di-t-butyl-4-hydroxyphenyl)propionate]methane having a 2,6-di-t-butylphenol skeleton, a hindered amine light stabilizer and a phosphorus compound are added to a polymeric compound (for example, Japanese Patent Kokai Publication 351669/1992).

However, this composition does not necessarily withstand thermal oxidation degradation, therefore improvement in oxidation degradation resistance is desirable.

In consideration of such circumstances, the present inventors have developed a polymeric compound with greatly improved thermal oxidation degradation resistance. As the result, the present inventors have found that, when a phenol antioxidant having a specific skeleton, o-t-butyl-o'-methyl-phenolic group, a hindered amine light stabilizer having a molecular weight of not less than 400 and a specific phosphorus compound, dihydrooxaphosphaphenanthrene are added, thermal oxidation degradation resistance is remarkably improved and also discoloration or coloring in contacting with a combustion gas and the like is prevented, and have accomplished the present invention.

SUMMARY OF THE INVENTION

The present invention provides a polymeric composition having excellent thermal oxidation degradation resistance and discoloration or coloring resistance, which comprises (A) a polymeric compound;

(B) a phenol antioxidant represented by the general formula (I):

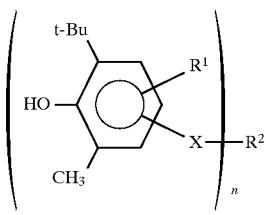

wherein $R^1$ is a hydrogen atom or lower alkyl group; n is 2 or 3; $R^2$ is a divalent alcohol residue when n is 2, and is a isocyanuric acid residue when n is 3; X is a lower alkylenecarbonyloxy group when n is 2, and is a lower alkylene group when n is 3);

(C) a hindered amine photostabilizer having a molecular weight of not less than 400; and (D) a dihydrooxaphosphaphenanthrene compound represented by the general formula (II)

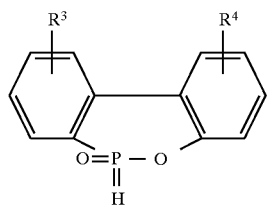

wherein $R^3$ and $R^4$, which are same or different, are a hydrogen atom, halogen atom or lower alkyl group.

DETAILED DESCRIPTION OF THE PREFERRED EMBODIMENTS

The phenol antioxidant (B) represented by the above-described general formula (I) of the present invention has a specific skeleton, o-t-butyl-o'-methyl-phenolic group, and the substituent $R^1$ is a lower alkyl group such as a hydrogen atom, methyl, ethyl, propyl, i-isopropyl, butyl, i-butyl, sec-butyl, t-butyl and pentyl. $R^1$ is preferably a hydrogen atom or methyl group.

Further, n is 2 or 3, $R^2$ is a divalent alcohol residue which may include an oxygen atom in the residue when n is 2 and is an isocyanuric acid residue when n is 3.

Here, example of the divalent alcohol residue includes a diol residue having approximately 4 to 15 carbon atoms such as diethylene glycol, triethylene glycol, tetraethylene glycol, pentaethylene glycol, hexaethylene glycol, 3,9-bis(1,1-dimethyl-2-dihydroxyethyl)-2,4,8,10-tetraoxaspiro[5.5]undecane, [2-(1,1-dimethyl-2-hydroxyethyl)-5-ethyl-1,3-dioxane-5-yl]methane and neopentyl glycol hydroxypivalate; and an alkylene diol residue having approximately 2 to 16 carbon atoms such as ethylene glycol, 1,3-propane diol, 1,4-butane diol, 1,2-pentane diol, 1,5-pentane diol, 2,4-pentane diol, neopentyl glycol, hexane diol, octane diol, decane diol and hexadecane diol.

The divalent alcohol residue is preferably a diol residue, more preferably a triethylene glycol residue or 3,9-bis(1,1-dimethyl-2-hydroxyethyl)-2,4,8,10-tetraoxaspiro[5.5]undecane residue.

X is a lower alkylenecarbonyloxy group when n is 2 and is a lower alkylene group when n is 3, and example of the lower alkylenecarbonyloxy group includes methylenecarbonyloxy, dimethylenecarbonyloxy, trimethylenecarbonyloxy, tetramethylenecarbonyloxy and pentamethylenecarbonyloxy. Among them, dimethylenecarbonyloxy is preferable.

Example of the lower alkylene group includes methylene, dimethylene, trimethylene, tetramethylene and pentamethylene, and, among them, methylene is preferable.

Representative example of the phenol antioxidant (B) represented by the above-described general formula (I) includes 3,9-bis[2-(3-(3-t-butyl-4-hydroxy-5-methylphenyl)propionyloxy)-1,1-dimethylethyl]-2,4,8,10-tetraoxaspiro[5.5]undecane, triethylene glycol bis[3-(5-t-butyl-3-methyl-4-hydroxyphenyl)propionate], tris(4-t-butyl-2,6-dimethyl-3-hydroxybenzyl)isocyanurate and the mixture thereof.

The phenol antioxidant (B) is includes in an amount from 0.01 to 5 parts by weight, preferably from 0.02 to 0.8 parts by weight based on 100 parts by weight of the polymeric compound (A).

When the content of the phenol antioxidant (B) is less than 0.01 parts by weight, sufficient thermal oxidation degradation resistance is not obtained, and when the antioxidant content is more than 5.0 parts by weight, high thermal oxidation degradation resistance that corresponds to the amount of antioxidant present is not achieved, which is neither economical nor protective of the physical properties of the polymeric compound.

The hindered amine photostabilizer ;(C) in the present invention, is a compound having a molecular weight of not less than 400 which has a 2,2,6,6-tetramethylpiperidine skeleton in its molecule. It is preferable that two or more of 2,2,6,6-tetramethylpiperidine skeleton exist in the molecule.

Representative examples of such a hindered amine photostabilizer (C) include bis(2,2,6,6-tetramethyl-4-piperidyl) sebacate (molecular weight; 480), bis(1,2,2,6,6-pentamethyl-4-piperidyl)sebacate (molecular weight; 508), bis(1,2,2,6,6-pentamethyl-4-piperidyl) 2-(3,5-di-t-butyl-4-hydroxybenzyl)-2-butylmalonate (molecular weight; 685), poly[[6-[(1,1,3,3-tetramethylbutyl)imino-1,3,5-triazine-2,4-diyl][(2,2,6,6-tetramethyl-4-piperidinyl)imino]-1,6-hexamethylene[(2,2,6,6-tetramethyl-4-piperidinyl)imino]] (molecular weight; not less than 2500), poly[(6-morpholino-1,3,5-triazine-2,4-diyl)[(2,2,6,6-tetramethyl-4-piperidyl) imino]hexamethylene[(2,2,6,6-tetramethyl-4-piperidyl) imino]] (molecular weight; not less than 1000), a polycondensate (molecular weight; not less than 3000) of dimethyl succinate and 1-(2-hydroxyethyl)-4-hydroxy-2,2,6,6-tetramethylpiperidine, and a condensate (molecular weight; not less than 2000) of N,N'-bis(3-aminopropyl) ethylenediamine and 2,4-bis(N-butyl-N-(1,2,2,6,6-pentamethyl-4-piperidyl)amino)-6-chloro-1,3,5-triazine. These may be used in combination.

Among them, bis(2,2,6,6-tetramethyl-4-piperidyl) sebacate, poly[[6-[(1,1,3,3-tetramethylbutyl)imino-1,3,5-triazine-2,4-diyl][(2,2,6,6-tetramethyl-4-piperidinyl)imino]-1,6-hexamethylene[(2,2,6,6-tetramethyl-4-piperidinyl) imino]], a polycondensate of dimethyl succinate and 1-(2-hydroxyethyl)-4-hydroxy-2,2,6,6-tetramethylpiperidine, and the like are preferably used.

The hindered amine photostabilizer (C) is usually present in an amount from 0.01 to 5 parts by weight, preferably from 0.02 to 0.8 parts by weight based on 100 parts by weight of the polymeric compound (A).

When the contact of the hindered amine photostabilizer (C) is less than 0.01 parts by weight, sufficient photodegradation resistance ability is not obtained, and when it is more than 5 weight, high photodegradation resistance ability correspond to the amount is not obtained, i.e. giving uneconomical results and deterioration of the physical properties of the polymeric compound is tend to be generated.

As the substituents $R^2$, $R^4$ in the dihydrooxaphosphaphenanthrene compound (D), for example, a hydrogen atom, a halogen atom such as chlorine, bromine and the like, a lower alkyl group such as methyl, ethyl, n-propyl, i-propyl, n-butyl, 1-butyl, sec-butyl, t-butyl, n-pentyl, i-pentyl, t-pentyl and the like, are listed.

Representative example of the dihydrooxaphosphaphenanthrene compound (D) include 9,10-dihydro-9-oxa-10-phosphaphenanthrene-10-oxide, 8-chloro-9,10-dihydro-9-oxa-10-phosphaphenanthrene-10-oxide, 8-t-butyl-9 and 10-dihydro-9-oxa-10-phosphaphenanthrene-10-oxide. Among them, 9,10-dihydro-9-oxa-10-phosphaphenanthrene-10-oxide is preferably used.

This phosphorus compound (D) is usually present in an amount from 0.1 to 2 parts by weight based on 1 part by weight of the phenol antioxidant (B) and from 0.01 to 1 part by weight based on 1 part by weight of the hindered amine photostabilizer (C). It is preferably comprised in an amount from 0.5 to 1 part by weight based on the phenol antioxidant (B) and from 0.2 to 0.5 parts by weight based on the hindered amine photostabilizer (C).

When the content of the phosphorus compound (D) is less than 0.01 parts by weight based on the phenol antioxidant (B), sufficient discoloration resistance is not obtained, and when it is more than 2 parts by weight, a correspondingly high level of discoloration resistance is not achieved, and the polymeric compound tends to degrade. When, the content of the phosphorus compound (D) is more than 1 part by weight based on the hindered amine photostablizer (C), deterioration of the photo resistance of the composition occurs.

The polymeric composition of the present invention may further include other various additives such as a processing stabilizer, antioxidant, light stabilizer, metal deactivator, metallic soap, nucleating agent, antistatic agent, lubricant, fire retardant, releasing agent, mildewproofing agent and filler. Specific examples of these various additives are listed below.

As a processing stabilizer, for example, 2-t-butyl-6-(3-t-butyl-2-hydroxy-5-methylbenzyl)-4-methylphenyl acrylate, 2-[1-2-hydroxy-3,5-di-t-pentylphenyl)ethyl]-4,6-di-t-pentylphenyl acrylate and the like are listed.

As a phosphorus antioxidant or sulfur antioxidant, for example, tris(nonylphenyl)phosphite, tris(2,4-dibutylphenyl)phosphite, bis(2,4-di-t-butylphenyl) pentaerythritol diphosphite, distearyl pentaerythritol diphosphite, tetrakis(2,4-di-t-butylphenyl) 4,4'-biphenylenediphosphite, 2,2'-ethylidenebis(4,6-di-t-butylphenyl)fluorophosphite, 2,2'-methylidenebis(4,6-di-t-butylphenyl)octylphosphite, dilauryl 3,3'-thiodipropionate, dimyristyl 3,3'-thiodipropionate, distearyl 3,3'-thiodipropionate, tetrakis(3-laurylthiopropionyloxymethyl) methane and the like are listed.

As a light stabilizer, for example, a ultraviolet absorber such as; a benzotriazole compound such as 2-(3-t-butyl-2-hydroxy-5-methyphenyl)-5-chlorobenzotriazole, 2-(3,5-di-t-butyl-2-hydroxyphenyl)benzotriazole, 2-(2-hydroxy-5-methylphenyl)benzotriazole, 2-(2-hydroxy-5-t-octylphenyl) benzotriazole, 2-(3,5-di-t-pentyl-2-hydroxyphenyl) benzotriazole, 2-[2-hydroxy-3-(3,4,5,6-tetrahydrophthalimidemethyl)-5-methylphenyl] benzotriazole, 2-[2-hydroxy-3,5-bis(α,α-dimethylbenzyl) phenyl]benzotriazole or the like; a hydroxybenzophenone compound such as 2,4-di-t-butylphenyl 3,5-di-t-butyl-4-hydroxybenzoate or the like; and cyanoacrylate compound such as ethyl 2-cyano-3,3-diphenyl acrylate or the like; a nickel quencher such as nickel dibutyldithiocarbamate, [2,2'-thiobis(4-t-octylphenolate)]-2-ethylhexylamine nickel or the like, and the like are listed.

As a metal deactivator, for example, N,N'-[3-(3,5-di-t-butyl-4-hydroxyphenyl)propionyl]hydrazine and the like are listed, and as a metallic soap, for example, calcium stearate, zinc stearate, nickel stearate and the like are listed.

Nucleating agents may be, for example, sorbitol compounds and phosphate compounds such as sodium di(4-t-butylphenyl)phosphonate, dibenzylidene sorbitol, sodium methylenebis(2,4-di-t-butylphenol)phosphate or the like.

Antistatic agents may be, for example, quaternary ammonium salt and alkylphosphate compound such as (β-lauramidepropyl)trimethylammonium methylsulfate and the like.

As a lubricant, for example, erucic acid amide, stearic acid amide, stearic acid monoglyceride and the like are suitable, and as the fire retardant, for example, halogen containing phosphates such sa tris(2-chloroethyl)phosphate and the like, halogen compounds such as hexabromocyclododecane, decabromodiphenyloxide and the like, metal containing inorganic compounds such as antimony trioxide, antimony pentaoxide, aluminium hydroxide and the like, the mixture thereof, and the like are suitable.

The polymeric compound (A) may be, for example, the following compounds:
(1) polyethylene, for example, low density polyethylene (LD-PE), high density polyethylene(HD-PE), linear-low density polyethylene(LD-PE),
(2) polypropylene,
(3) α-olefin polymer, for example, 1-butene polymer, 1-hexene polymer, methyl butene polymer, methyl pentene polymer,
(4) EEA (ethylene/ethyl acrylate copolymer)resin
(5) EVA (ethylene/vinyl acetate copolymer)resin
(6) polystyrenes, for example, polystyrene, poly(p-methylstyrene), poly(α-methylstyrene),
(7) AS (acrylonitrile/styrene copolymer)resin
(8) ABS (acrylonitrile)butadiene/styrene copolymer)resin
(9) AAS (special acryl rubber/acrylonitrile/styrene copolymer),
(10) ACS (acrylonitrile/chlorinated polyethylene/styrene copolymer)resin,
(11) chlorinated ethylene, polychloroprene, chlorinated rubber,
(12) poly vinyl chloride, poly vinylidene chloride,
(13) methacrylic resin,
(14) ethylene/vinyl alcohol copolymerized resin,
(15) fluororesin,
(16) polyacetal,
(17) graft polyphenylene ether resin and polyphenylene sulfide resin,
(18) polyurethane,
(19) polyamide,
(20) polyethylene terephthalate, polybutylene terephthalate,
(21) polycarbonate,
(22) polyacrylate,
(23) polysulfone, polyether ether ketone, polyether sulfone,
(24) aromatic polyester resin,
(25) epoxy resin,
(26) diallyl phthalate prepolymer,
(27) silicone resin,
(28) unsaturated polyester resin,
(29) acrylic modified benzoquanamine resin,
(30) benzoquanamine/melamine resin,
(31) urea resin,
(32) polybutadiene,
(33) 1,2-polybutadiene,
(34) polyisoprene,
(35) styrene/butadiene copolymer,
(36) butadiene/acrylonitrile copolymer,
(37) ethylene/propylene copolymer,
(38) silicone rubber,
(39) epichlorohydrin rubber,
(40) acrylic rubber,
(41) natural rubber,
(42) chlorinated rubber paint,
(43) polyester resin paint,
(44) urethane resin paint,
(45) epoxy resin paint,
(46) acrylic resin paint,
(47) vinyl resin paint,
(48) aminoalkyl resin paint,
(49) alkyd resin paint,
(50) nitrocellulose resin paint,
(51) oil paint,
(52) wax,
(53) lubricant oil.

They may be used alone or in combination. The polymeric compound (A) is not limited to the aforementioned.

Among the, olefin polymers such as polyethylene, polypropylene and α-olefin polymer, are preferable.

For inclusion of the phenol antioxidant (B), the hindered amine photostabilizer (C) and the phosphorus compound (D) and the other additives optionally used, in the polymeric compound (A), there are adopted various blending methods suitable for obtaining a homogeneous mixture, for example, methods in which an extruder, banbury mixer, kneader and the like can be used.

These additives may be added simultaneously with the polymeric compound (A), or may be added separately. It is preferable to blend the master batch or a mixture of these additives obtained by homogeneous mixing of these additives.

EXAMPLE

The present invention will be further explained in detail in the following nonlimiting examples.

| [formulation] | |
| --- | --- |
| unstablized polyproplene | 100 parts by weight |
| calcium stearate | 0.1 |
| tris(2,4-di-t-butylphenyl)phosphite | 0.05 |
| tested compounds | listed in Table |

A0-1: tetrakis(methylene-3-(3,5-di-t-butyl-4-hydroxyphenyl)propionate]methane
B-1: 3,9-bis[2-(3-(3-t-butyl-4-hydroxy-5-methylphenyl) propionyloxy)-1,1-dimethylethyl]-2,4,8,10-tetraoxaspiro [5.5]undecane
B-2: triethylene glycol bis[3-(5-t-butyl-3-methyl-4-hydroxyphenyl)propionate]
B-3: tris(4-t-butyl-2,6-dimethyl-3-hydroxybenzyl) isocyanurate
C-1: bis (2,2,6,6-tetramethyl-4-piperidyl)sebacate
C-2: poly[[6-[(1,1,3,3-tetramethylbutyl)imino-1,3,5-triazine-2,4-diyl][(2,2,6,6-tetramethyl-4-piperidinyl) imino]-1,6-hexamethylene[(2,2,6,6-tetramethyl-4-piperidinyl)imino]]
C-3: polycondensate of dimethyl succinate and 1-(2-hydroxyethyl)-4-hydroxy-2,2,6,6-tetramethylpiperidine
D-1: 9,10-dihydro-9-oxa-10-phosphaphenanthrene-10-oxide

[Processing]

The above-described components were compounded and pelletized at 240° C. using a 40 mm φ single-screw extruder. The resulted pellet was spun using a spinning machine, stretched at 135° C. to obtain a 20 denier polypropylene fiber.

Examples 1 to 3, Comparative Example 1

Thermal oxidation degradation resistance was evaluated by keeping the temperature of the polypropylene fiber at 150° C. and measuring the number of day before break of the fiber due to embrittlement, and the results are shown in Table 1. In Table 1, amounts are weight basis.

TABLE 1

| No. | Tested compound (content) | | | Thermal oxidation degradation resistance |
|---|---|---|---|---|
| Example 1 | B-1 (0.1) | C-2 (0.1) | D-1 (0.02) | 5 days |
| Example 2 | B-1 (0.1) | C-2 (0.1) | D-1 (0.05) | 5 days |
| Example 3 | B-1 (0.1) | C-2 (0.1) | D-1 (0.1) | 5 days |
| Comparative Example 1 | AO-1 (0.1) | C-2 (0.1) | D-1 (0.1) | 3 days |

Examples 4 to 16, Comparative Example 2

The polypropylene fiber was exposed to a combustion gas at 130° C. for 5 minutes, hue after exposure was visually evaluated by naked eyes, and the results are shown in Table 2. In Table 2, amounts are weight basis.

TABLE 2

| No. | Tested compound (content) | | | Hue |
|---|---|---|---|---|
| Example 4 | B-1 (0.1) | C-2 (0.1) | D-1 (0.02) | Pale pink |
| Example 5 | B-1 (0.1) | C-2 (0.1) | D-1 (0.05) | white |
| Example 6 | B-1 (0.1) | C-2 (0.1) | D-1 (0.1) | white |
| Example 7 | B-1 (0.1) | C-1 (0.1) | D-1 (0.1) | White |
| Example 8 | B-1 (0.1) | C-3 (0.1) | D-1 (0.1) | White |
| Example 9 | B-1 (0.1) | C-1 (0.05) C-3 (0.05) | D-1 (0.1) | White |
| Example 10 | B-1 (0.1) | C-2 (0.2) | D-1 (0.1) | White |
| Example 11 | B-1 (0.03) | C-2 (0.06) | D-1 (0.03) | white |
| Example 12 | B-1 (0.6) | C-2 (0.6) | D-1 (0.3) | Pale pink |
| Example 13 | B-1 (0.1) | C-2 (0.3) | D-1 (0.1) | white |
| Example 14 | B-1 (0.1) | C-2 (0.3) | D-1 (0.2) | white |
| Example 15 | B-2 (0.1) | C-2 (0.1) | D-1 (0.1) | white |
| Example 16 | B-3 (0.1) | C-2 (0.1) | D-1 (0.1) | white |
| Comparative example 2 | B-1 (0.1) | C-2 (0.1) | | Pale pink |

Example 17, Comparative Example 3

Photo resistance test was conducted by irradiating the polypropylene fiber with xenon light. The irradiation energy amount until the tensile strength at break reduced to half of the initial value [T(½)] was shown in Table 3. In Table 3, amounts are weight basis.

TABLE 3

| No. | Tested compound (content) | | | [T (1/2)] |
|---|---|---|---|---|
| Example 16 | B-1 (0.1) | C-3 (0.1) | D-1 (0.02) | 580 KJ |
| Comparative example 3 | AO-1 (0.1) | C-2 (0.1) | D-1 (0.05) | 530 |

Effect of the Invention

The composition can realize the prevention of discoloration or coloring in contacting with a combustion gas and the like and the remarkable improvement of thermal oxidation degradation resistance at the same time, by containing the phenol antioxidant having a specific skeleton o-t-butyl-o'-methyl-phenylic group, the hindered amine photostablizer having a molecular weight of not less than 400 and the specific phosphorus compound dihydrooxaphosphaphenanthrene.

What is claimed is:

1. A polymeric composition which comprises:
   (A) a polymeric compound,
   (B) a phenol antioxidant represented by the general formula (I):

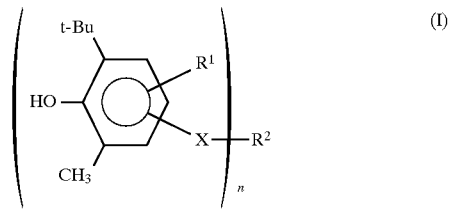

wherein, $R^1$ is a hydrogen atom or lower alkyl group; n is 2 or 3; $R^2$ is a divalent alcohol residue when n is 2, and is a isocyanuric acid residue when n is 3; X is a lower alkylenecarbonyloxy group when n is 2, and is a lower alkylene group when n is 3;
   (C) a hindered amine photostabilizer having a molecule weight of not less than 400; and
   (D) a dihydrooxaphosphaphenanthrene compound represented by the general formula (II)

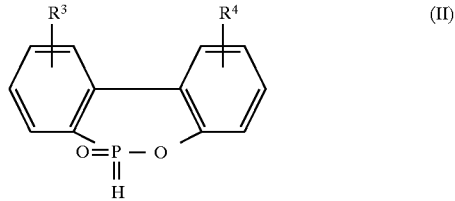

wherein $R^3$ and $R^4$, which are same or different, are a hydrogen atom, halogen atom or lower alkyl group.

2. The polymeric composition according to claim 1, in which $R^1$ in the phenol antioxidant is a hydrogen atom or methyl group.

3. The polymeric composition according to claim 1, in which n is 2, $R^2$ is a triethylene glycol residue or 3,9-bis(1,1-dimethyl-2-hydroxyethyl)-2,4,8,10-tetraoxaspiro[5.5] undecane residue and X is dimethylenecarbonyloxy.

4. The polymeric composition according to claim 1, in which n is 3, $R^2$ is a isocyanuric acid residue and X is methylene.

5. The polymeric composition according to claims 1, in which the phenol antioxidant (B) is at least one selected from 3,9-bis[2-(3-(3-t-butyl-4-hydroxy-5-methylphenyl) propionyloxy)-1,1-dimethylethyl]-2,4,8,10-tetraoxaspiro [5.5]undecane, triethylene glycol bis[3-(5-t-butyl-3-methyl-4-hydroxyphenyl)propionate] and tris(4-t-butyl-2,6-dimethyl-3-hydroxybenzyl)isocyanurate.

6. The polymeric composition according to claims 1, in which the content of the phenol antioxidant (B) is from 0.01 to 5 parts by weight based on 100 parts by weight of the polymeric compound (A).

7. The polymeric composition according to claims 1, in which the hindered amine photostabilizer (C) is at least one selected from bis(2,2,6,6-tetramethyl-4-piperidyl)sebacate, poly[[6-[(1,1,3,3-tetramethylbutyl)imino-1,3,5-triazine-2,4-diyl][(2,2,6,6-tetramethyl-4-piperidinyl)imino]-1,6-hexamethylene[(2,2,6,6-tetramethyl-4-piperidinyl)imino], and the polycondensate of dimethyl succinate and 1-(2-hydroxyethyl)-4-hydroxy-2,2,6,6-tetramethylpiperidine.

8. The polymeric composition according to claims 1, in which the content of the hindered amine photostabilizer (C)

is from 0.01 to 5 parts by weight based on 100 parts by weight of the polymeric compound (A).

9. The polymeric composition according to claims 1, in which the phosphorus compound (D) is at least one selected from 9,10-dihydro-9-oxa-10-phosphaphenanthrene-10-oxide, 8-chloro-9,10-dihydro-9-oxa-10-phosphaphenanthrene-10-oxide and 8-t-butyl-9,10-dihydro-9-oxa-10-phosphaphenanthrene-10-oxide.

10. The polymeric composition according to claims 1, in which the content of the phosphorus compound (D) is from 0.1 to 2 parts by weight based on 1 part by weight of the phenol antioxidant (B) and from 0.01 to 1 part by weight based on 1 part by weight of the hindered amino photostabilizer (C).

* * * * *